UNITED STATES PATENT OFFICE.

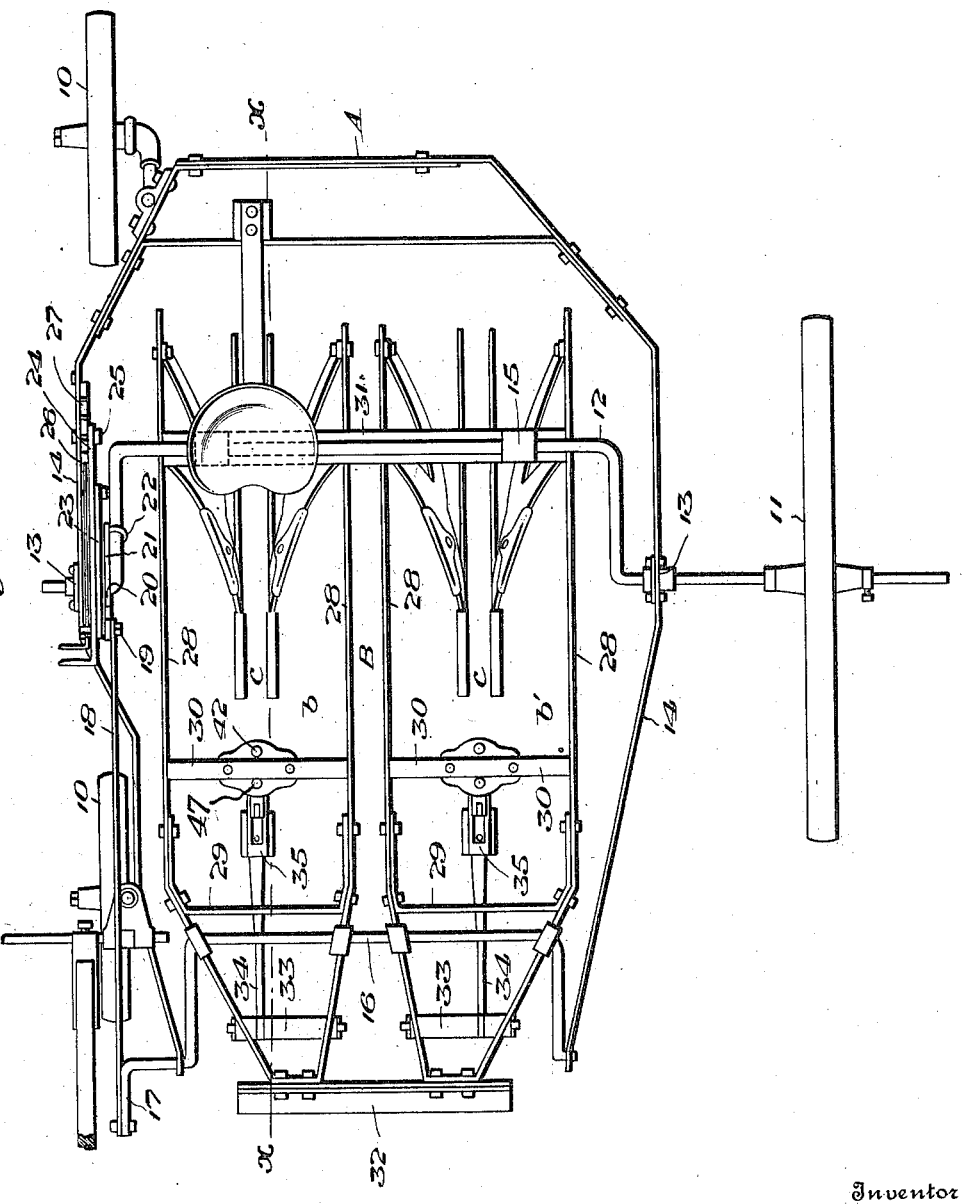

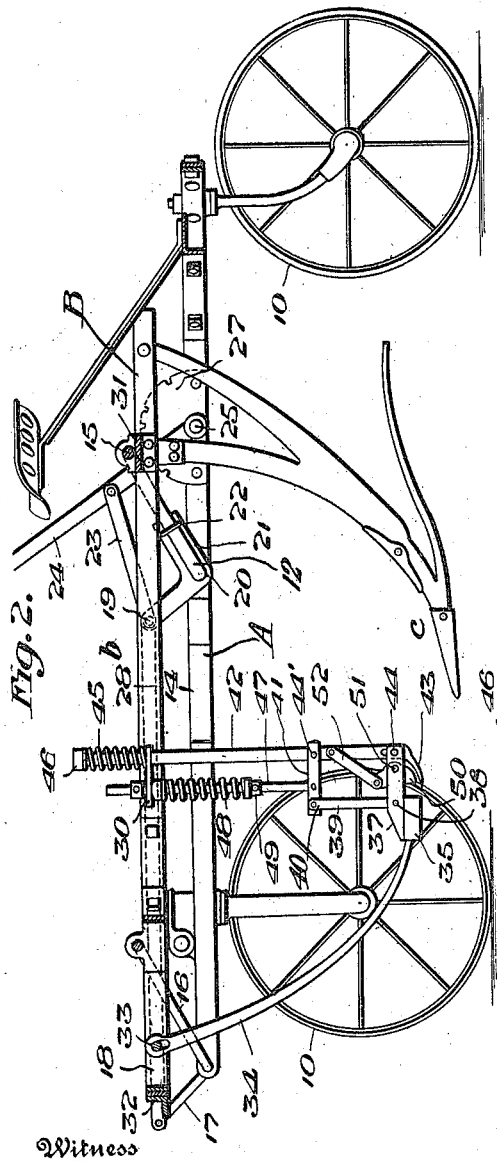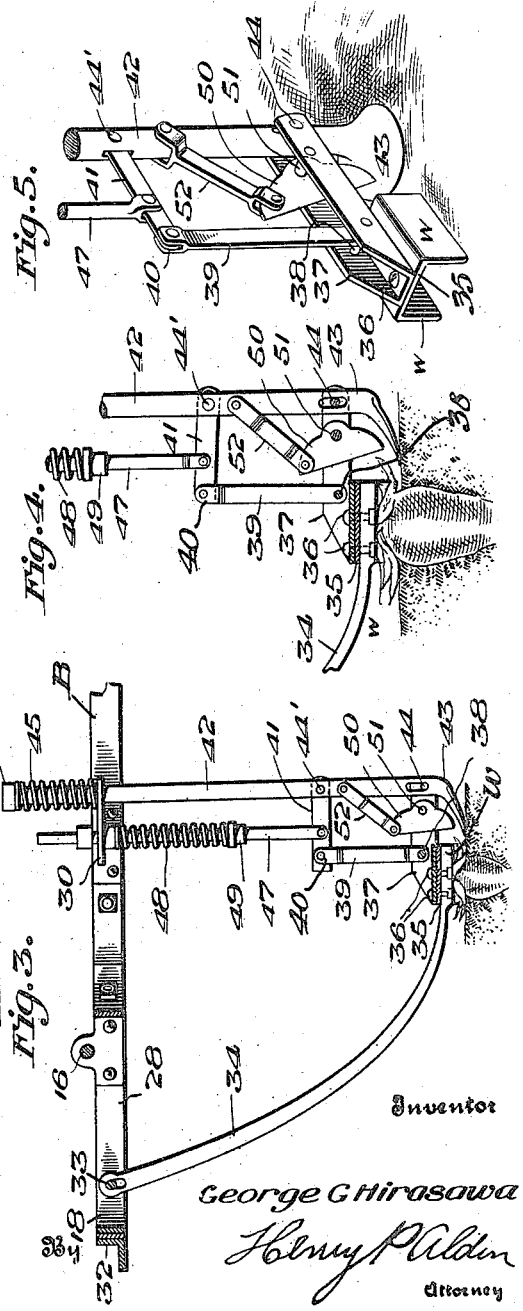

GEORGE G. HIRASAWA, OF OGALLALA, NEBRASKA.

BEET-HARVESTER.

1,261,233.    Specification of Letters Patent.    Patented Apr. 2, 1918.

Application filed July 18, 1917. Serial No. 181,306.

*To all whom it may concern:*

Be it known that I, GEORGE G. HIRASAWA, a subject of Japan, residing at Ogallala, in the county of Keith, State of Nebraska, have invented new and useful Improvements in Beet-Harvesters, of which the following is a specification.

This invention relates to certain new and useful improvements in beet-harvesters and more particularly has reference to improved means of a simple and efficient type for removing by a cutting action the foliage and a portion of the top or crown of the beet projecting above the ground which is considered to contain impaired qualities not deemed desirable as, for example, when the beet is used for sugar-making and the like.

The principal object of the invention consists in the provision of improved mechanism automatically actuated to properly sever such portion of the beet as projects above the ground according to the degree or amount of its projection thereabove.

Other and further objects and advantages of the invention will be hereinafter set forth and the novel features thereof defined by the appended claims.

In the drawings—

Figure 1 is a plan of a harvester embodying the invention;

Fig. 2 is a sectional side elevation taken on the line X—X of Fig. 1;

Fig. 3 is an enlarged sectional detail of the improved mechanism showing it in the act of severing a beet which projects but slightly above the ground;

Fig. 4 is another enlarged sectional detail of the mechanism showing the parts in their automatically adjusted positions prior to the topping action of a somewhat larger beet; and Fig. 5 is an enlarged detail perspective of the mechanism.

Like numerals of reference refer to like parts in the several figures of the drawings.

As illustrated in the accompanying drawings, A represents the main frame of a harvester designed to accomplish the several operations hereinafter explained upon two rows of beets or similar vegetables simultaneously, the frame being capable of propulsion through the medium of the two wheels 10—10 and the larger wheel 11, an axle 12 on which the latter wheel is mounted having bearings 13—13 in the main frame, between the side bars 14—14 of which the said axle is off-set or of substantially U-shape and supports an auxiliary frame B adjacent its rear end by means of the bearing sleeves 15. A second member 16, off-set between its ends, is journaled in the corresponding forward ends of the side bars of the main frame and suspends the front portion of the auxiliary frame B. At one of its ends, the member 16 is extended and bent angularly upward to form a crank 17 which is pivotally secured to one extremity of a rod 18, the other end of which is similarly secured by a pin 19 to one arm of a bell-crank mounted at its angle portion 20 about the axle 12 adjacent one of the side bars 14, the other arm 21 of the bell-crank having a connection as by the staple 22 with the off-set portion of the axle. A short link 23 is likewise pivotally connected at one end by the pin 19 to the bell-crank and at its other end, the link is pivoted to an operating lever 24 which, in turn, is pivoted at 25 to a side bar of the main frame, the lever being equipped with the usual detent 26 for engagement with and retention in selective position by means of the segmental rack 27 attached to the side bar 14 of the main frame.

Through the mechanism above described, it will be seen that the auxiliary frame may, by appropriate movement of the lever, be raised and lowered with respect to the main frame and thus cause the topping and digging mechanism about to be described to be thrown into and out of operative topping and digging position with respect to the ground surface.

The auxiliary frame B consists of two identical sections $b$ and $b'$, each of which is formed preferably of an iron bar 28 bent intermediate the ends thereof to assume the shape shown in Fig. 1, such structures being individually braced at intervals by cross-pieces 29 and 30 and secured together near their rear ends by the transverse bar 31 journaled to the axle 12 and at their forward ends by the angle iron 32. Due to the similarity of these sections in their entirety, further description of the one will suffice for both.

Loosely hung from a short rod 33, extending transversely and secured between the opposite sides of the section adjacent its forward end, is an arcuate trailing arm 34 carrying at its lower end an inverted U-shaped gage-shoe 35 fastened thereto by means of bolts 36 and between the walls w—w of which the projecting cap or crown of the beet and its foliage pass for governing the throw of the horizontal knife to be explained. Secured to the top of the shoe member is a rearwardly extending channel iron 37 within which a pin 38 is secured to form a pivot for the lower end of a link 39 having a bifurcated upper extremity 40 (see Fig. 5) to which is pivoted one end of a lever 41. An upstanding arm 42 carrying at its lower end a horizontal stationary cutter-knife 43 has a slotted connection about a pin 44 secured between projecting side walls forming part of the channel iron and a similar connection 44' to the free end of lever 41. The upper portion of the arm 42 passes through an aperture formed approximately centrally in the cross-piece 30 and has disposed thereabout a helical spring 45 bearing against the said cross-piece at its lower end and at its upper end against a collar 46 secured to the arm.

A second substantially vertical upstanding arm 47 is pivotally attached to the lever 41 at a point slightly forward of its longitudinal center and has its upper end passing through an aperture formed in the cross-piece 30, a helical spring 48 being held about the arm 47 by the cross-piece at the upper end and a collar 49 secured to the arm 47 at the lower end of the spring.

The trailing severing mechanism further consists of a substantially vertical slicer knife 50 which, as shown in Figs. 3 and 4, is pivoted at 51 within the channel iron and extends through a slot formed in the base of the channel iron a link 52 pivotally connecting the knife to the upstanding arm 42 whereby the angularity assumed by its cutting edge is altered according to the varying movements imparted to the arm 42, thus minimizing as much as possible the resistance occasioned by passage through beets of different sizes.

In the drawings, the topping mechanism is shown as an operative unit forming part of a beet harvester embodying the usual digging and elevating mechanism C connected to and depending from the auxiliary frame sections so as to be simultaneously raised and lowered from and toward the ground surface with the topping mechanism through the movements of the hand lever 24. It will of course be understood, however, that the topping mechanism is fully capable of independent use as such and is not necessarily associated with the digging mechanism of a beet harvester.

The operation of the machine will, it is believed, be amply intelligible in view of the foregoing description; but it should be here explained that the successful performance of its functions by the topping mechanism depends to quite an extent upon the relative strengths of the helical springs 45 and 48. To secure the proper throw of the severing knife, it will be understood that the force required to compress the spring 48 must be greater than that required to have a corresponding effect on the spring 45, or in other words the spring 48 must or should be stronger than that 45. This necessary difference in the spring strengths may be lessened somewhat by adjusting the pivotal connection of the arm 47 along the longitudinal length of the lever 41.

By the use of the spring-actuated mechanism described, the proper topping of beets is automatically accomplished with less likelihood of injury by bruising or crushing of the vegetable than has been the case with machines heretofore used.

Having described my invention, what I desire to secure by Letters Patent is—

1. A beet harvester having a frame provided with topping mechanism comprising a trailing member pivotally attached to the frame, a gage-shoe secured to the member and having a yielding connection with the frame for substantially vertical movement, and a horizontally disposed severing knife operatively connected with said gage for vertical throw thereby inversely to the movements of the gage.

2. A beet harvester comprising a frame and automatic topping mechanism, said mechanism having a pivotal trailing connection with said frame and a two-point vertically yieldable suspension therefrom, the one tending to resist upward movement and the other tending to resist downward movement.

3. A beet harvester comprising a frame and automatic topping mechanism, said mechanism having a pivotal trailing connection with said frame and a two-point vertically yieldable suspension therefrom, the one tending to resist upward movement and the other tending to resist downward movement in different degrees.

4. A beet harvester comprising a frame and automatic topping mechanism, said mechanism having a pivotal trailing connection with said frame and a two-point vertically yieldable suspension therefrom, the one tending to resist upward movement and the other tending to resist downward movement to greater and less degrees, respectively, and means operatively connecting said yieldable points of suspension whereby movement of the one in one direction effects a simultaneous movement of the other in the reverse direction.

5. A beet harvester comprising a frame and automatic topping mechanism, said mechanism having a pivotal trailing connection with said frame and a two-point vertically yieldable suspension therefrom, the one tending to resist upward movement and the other tending to resist downward movement to greater and less degrees, respectively, and means operatively connecting said yieldable points of suspension whereby movement of the former in one direction effects simultaneous movement of the latter in the reverse direction and to a greater extent.

6. A beet harvester having a frame provided with topping mechanism comprising a trailing arm connected with the frame for oscillatory movement in a vertical plane, a gage-shoe rigidly carrying a rearwardly extending member secured to said arm, a vertical link pivotally attached at one end to said member, an upstanding arm provided with a horizontal severing knife at its lower end having a slotted connection with said member and a yieldable point of suspension from said frame for resisting downward movement, a lever connecting said vertical link to said upstanding arm, and a second upstanding arm having a yieldable point of suspension with said frame for resisting upward movement and connected to said lever forming a fulcrum therefor.

7. A beet harvester comprising, in combination, a main frame having an auxiliary frame mounted for vertical oscillatory movement independent of the main frame, topping mechanism comprising a trailing gage-shoe, an arcuate arm pivotally connecting said gage to said auxiliary frame for movement in a vertical plane, an upstanding arm carrying a horizontal cutter at its lower end and having a yielding point of suspension from said auxiliary frame, and means operatively connecting said upstanding arm with said gage whereby movement of the gage in either direction effects a simultaneous reverse movement of the said upstanding arm.

8. A beet harvester comprising a frame and mechanism for automatically severing the beet vertically and horizontally, said mechanism comprising a trailing arm pivotally attached to the frame, a gage-shoe rigidly carrying a rearwardly extending member secured to said arm, an upstanding arm carrying a horizontal cutter at its lower end and having a yielding point of suspension from said frame, means operatively connecting said upstanding arm with said member whereby movement of the gage in either direction effects a simultaneous reverse movement of the upstanding arm, a substantially vertical cutter pivotally mounted in said member, and a link pivotally connecting said vertical cutter to said upstanding arm whereby the different movements of the upstanding arm alter the angularity of the link-connected cutter in a vertical plane.

9. A beet harvester comprising, in combination, a main frame having an auxiliary frame supporting at its rear digging mechanism depending therefrom, said auxiliary frame being mounted in said main frame for vertical oscillatory movement independent thereof, topping mechanism comprising a pivotal trailing connection with said auxiliary frame at its forward end and a two-point vertically yieldable suspension therefrom, the one tending to resist upward movement and the other tending to resist downward movement in unequal degrees.

GEORGE G. HIRASAWA.

Copies of this patent may be obtained for five cents each, by addressing the "Commissioner of Patents, Washington, D. C."